United States Patent
Vrana et al.

(10) Patent No.: US 8,337,113 B2
(45) Date of Patent: Dec. 25, 2012

(54) STAMPED LINK FOR SUPPORTING AN ENGINE

(75) Inventors: John J. Vrana, Rochester Hills, MI (US); Robert D. Kucinski, Clay, MI (US)

(73) Assignee: Radar Industries, Inc., Warren, MI (US)

( * ) Notice: Subject to any disclaimer, the term of this patent is extended or adjusted under 35 U.S.C. 154(b) by 52 days.

(21) Appl. No.: 12/786,657

(22) Filed: May 25, 2010

(65) Prior Publication Data
US 2010/0316440 A1    Dec. 16, 2010

Related U.S. Application Data

(60) Provisional application No. 61/185,615, filed on Jun. 10, 2009.

(51) Int. Cl.
*E04G 7/14* (2006.01)
(52) U.S. Cl. .................... 403/385; 267/141.2
(58) Field of Classification Search .............. 403/385, 403/389, 396, 398, 400; 267/293, 141.3, 267/141.2, 152
See application file for complete search history.

(56) References Cited

U.S. PATENT DOCUMENTS

| | | | | |
|---|---|---|---|---|
| 3,030,101 A | * | 4/1962 | McIntosh | 267/270 |
| 3,121,348 A | * | 2/1964 | Reed | 74/588 |
| 4,619,549 A | * | 10/1986 | Gilbreth | 403/349 |
| 4,817,909 A | * | 4/1989 | Deane | 248/610 |
| 5,398,907 A | * | 3/1995 | Kelchner | 248/634 |
| 6,113,058 A | * | 9/2000 | Iwasaki | 248/678 |
| 6,481,673 B1 | * | 11/2002 | Roe et al. | 248/62 |
| 7,350,778 B2 | * | 4/2008 | Endo | 267/141.2 |
| 2004/0232607 A1 | * | 11/2004 | Bodin et al. | 267/140.12 |
| 2005/0206057 A1 | * | 9/2005 | Endo | 267/292 |
| 2005/0212188 A1 | * | 9/2005 | Endo | 267/141.2 |
| 2005/0254888 A1 | * | 11/2005 | Oji | 403/187 |
| 2006/0231993 A1 | * | 10/2006 | Collyer et al. | 267/270 |
| 2007/0272051 A1 | * | 11/2007 | Kamei et al. | 74/579 R |
| 2007/0289118 A1 | * | 12/2007 | Endo | 29/527.1 |

FOREIGN PATENT DOCUMENTS

| | | |
|---|---|---|
| DE | 196 31 893 A1 | 2/1998 |
| FR | 2 794 502 A1 | 12/2000 |
| JP | 60-178655 | 11/1985 |
| JP | 61-233214 | 10/1986 |
| JP | 2003206991 A * | 7/2003 |

OTHER PUBLICATIONS

PCT Written Opinion of the International Searching Authority of International Application No. PCT/US2010/037474 dated Oct. 20, 2010; 11 pages.
PCT International Search Report of International Application No. PCT/US2010/037474 dated Oct. 20, 2010; 7 pages.

* cited by examiner

*Primary Examiner* — Michael P Ferguson
*Assistant Examiner* — Daniel Wiley
(74) *Attorney, Agent, or Firm* — Howard & Howard Attorneys PLLC

(57) ABSTRACT

A torque arm for securing the position of a power train relative to a motor vehicle includes a first mount and a second mount. The first mount and the second mount are spaced by a body portion. The first mount is formed by a continuous ring defining a first central opening and is integral with the body portion. The second mount is formed by a loop defining a second central opening and the loop extends from the body portion at an opposite end of the body portion from the continuous ring.

12 Claims, 5 Drawing Sheets

STAMPED LINK FOR SUPPORTING AN ENGINE

BACKGROUND OF THE INVENTION

Vehicle engine systems generate substantial amounts of torque when transferring motor energy generated in an internal combustion engine or the like through drive shaft to wheels that propel the vehicle. Torque generated by the engine is known to rotate the engine inside the motor compartment of the vehicle. Therefore, various devices have been produced to secure the engine within the vehicle compartment to prevent the engine from pivoting as a result of the torque transferred to the wheels.

One such device is known as a cast link or torque arm that is bolted between an engine block and a frame of a motor vehicle. These cast links have typically been manufactured through a casting process so that mass or thickness can be easily distributed or transferred to various parts of the link for both providing additional strength, and managing engine harmonics to prevent vibration from being transferred through the vehicle frame to the passenger compartment. While the transfer of mass around a cast link is known to provide the desired characteristics, the use of the casting process, due to its slow cycle time, is known to be cost prohibitive. Furthermore, a cast link having variable thickness used to achieve necessary performance, adds a significant amount of mass to a motor vehicle adversely affecting vehicle mileage performance. Therefore, there is a need to provide a low mass, quick cycle time torque arm that provides required strength characteristics along with necessary damping of engine harmonics.

SUMMARY OF THE INVENTION

A torque arm secures the position of a power train relative to a motor vehicle. A first mount is spaced from a second mount by a body portion. The first mount is formed by a continuous ring defining a central opening and is integrally formed with the body portion. The second mount is formed by a loop that defines a second central opening. The loop extends from the body portion at an opposite end of the body portion from the continuous ring. The torque arm is formed from a sheet of material having a substantially constant thickness throughout.

The torque arm of the present invention provides necessary strength characteristics of being formed from a sheet of material, which substantially reduces the mass associated with a cast metal torque arm. Furthermore, forming a torque arm from a sheet of material provides rapid cycle times by way of a progressive or equivalent type die eliminating the time associated with waiting for cast metal parts to cool, which is a known production bottle neck.

BRIEF DESCRIPTION OF THE DRAWINGS

Other advantages of the present invention will be readily appreciated as the same becomes better understood by reference to the following detailed description when considered in connection with accompanying drawings, wherein.

DETAILED DESCRIPTION OF THE INVENTION

Figure 1:
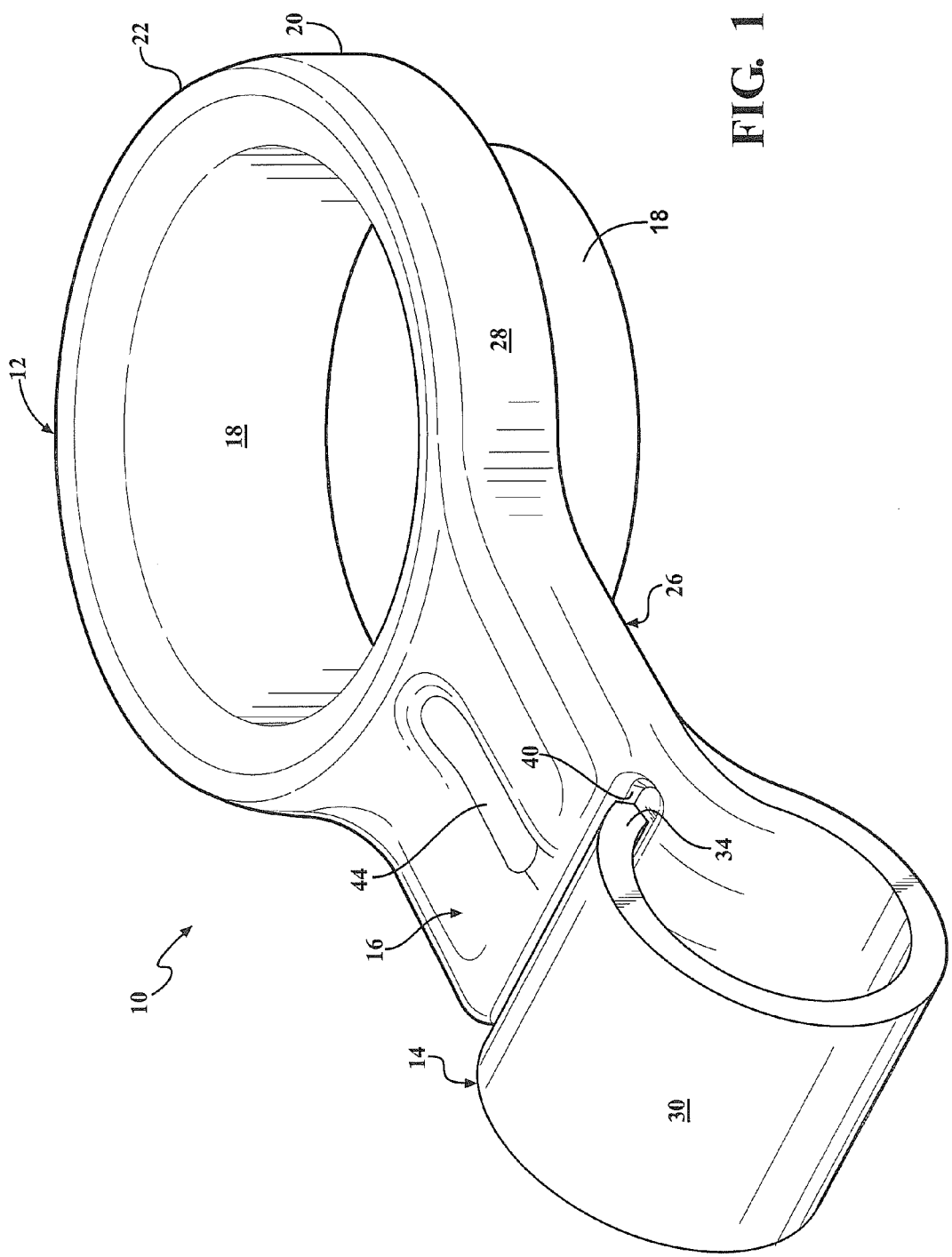
FIG. 1 shows a perspective view of the inventive arm of the present invention.

The link of the present invention is generally shown in FIG. 1 at 10. The link includes a first mount 12 and a second mount 14. The mounts 12, 14 are interconnected by a body portion 16. The link, including the first mount 12 and the second mount 14, and body portion 16, is formed from a continuous sheet of metal having a generally constant thickness. The link 10 having been formed from a continuous sheet of metal with a generally constant thickness retains the generally constant thickness after forming.

Figure 3:
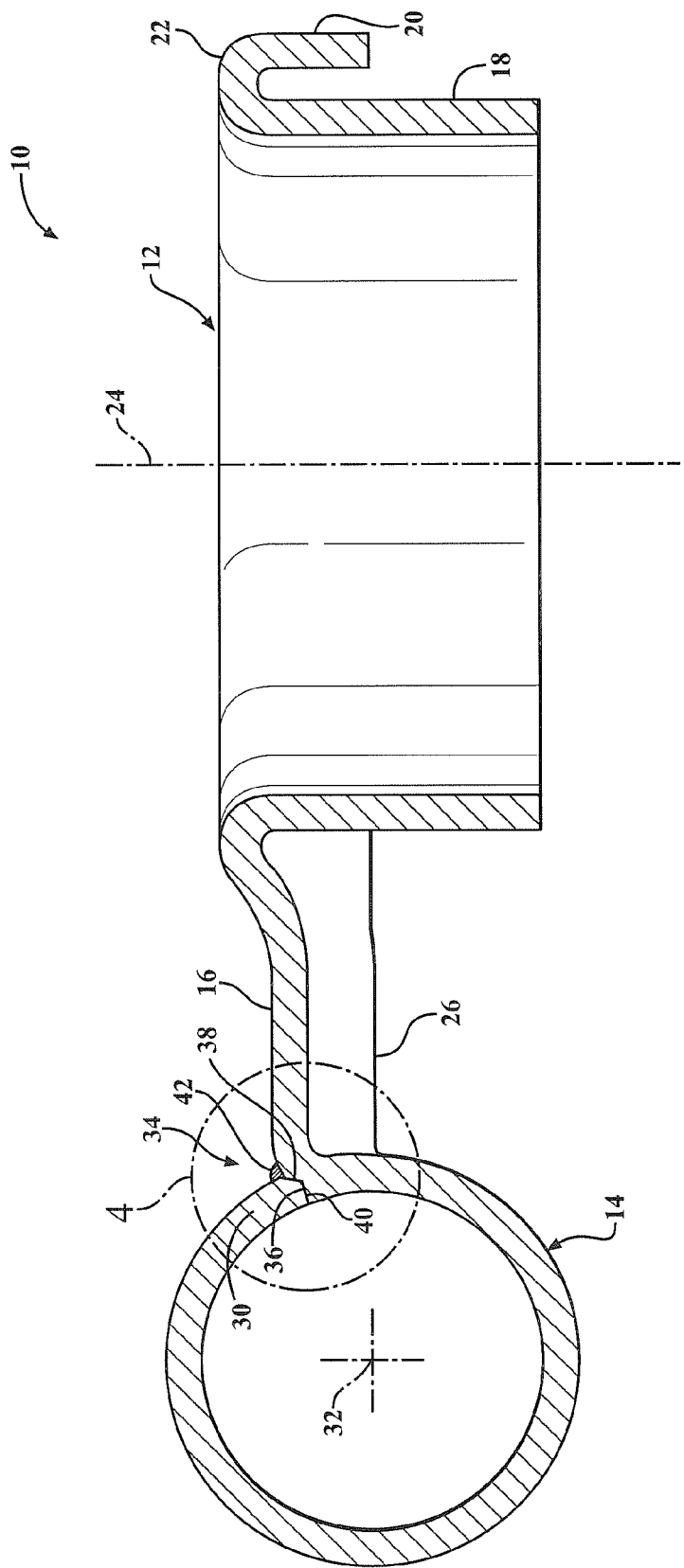
FIG. 3 shows a cross-sectional view of the arm of the present invention taken along line 3-3 as shown in FIG. 2.

The first mount 12 is defined by an inner annular wall 18 and an outer annular wall 20. The inner annular wall 18 and the outer annular wall 20 are interconnected by a mating wall 22 having a radial shape as will be explained further below. As best represented in FIG. 3, the first mount 12 defines a first axis 24 so that the inner annular wall 18 and the outer annular wall 20 are coaxially and concentrically aligned with the first axis 24. As best represented in FIG. 3, the inner annular wall 18 includes an axial length that exceeds the axial length of the outer annular wall 20. As such, the inner annular wall 18, the outer annular wall 20 and the mating wall 22 define a J-shaped cross-section to provide strength and dimensional stability to the first mount 12.

Referring again to FIG. 1, the body portion 16 includes opposing flanges 26 that extend along a length of the body portion 16. The opposing flanges 26 provide strength and dimensional stability to the body portion 16. Furthermore, the outer annular wall 20 of the first mount 12 defines a continuous surface 28 with the opposing flanges 26 further providing strength and dimensional stability to the link 10 in its entirety.

Figure 2:
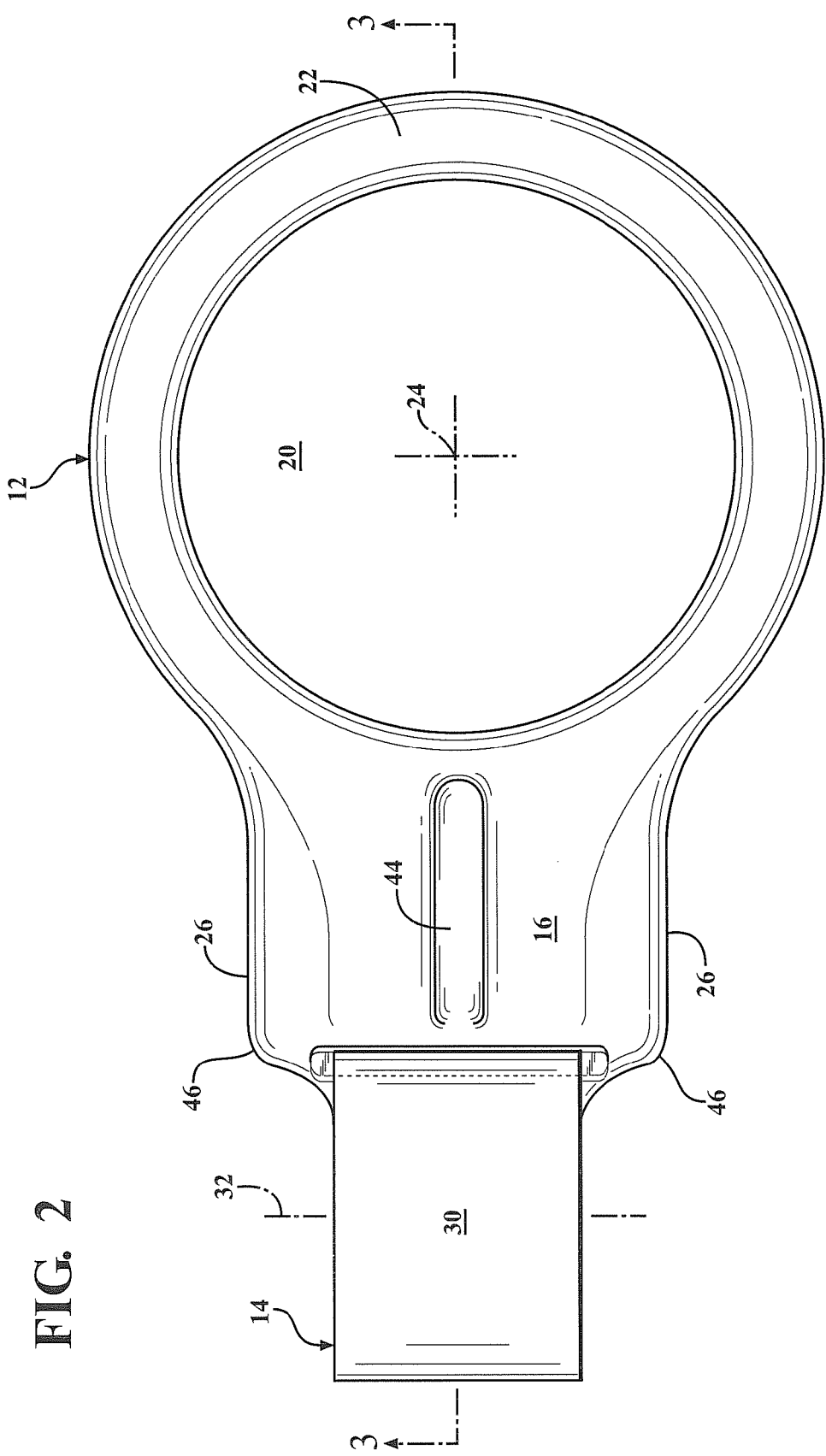
FIG. 2 shows a plan view of the present invention.
Figure 4:
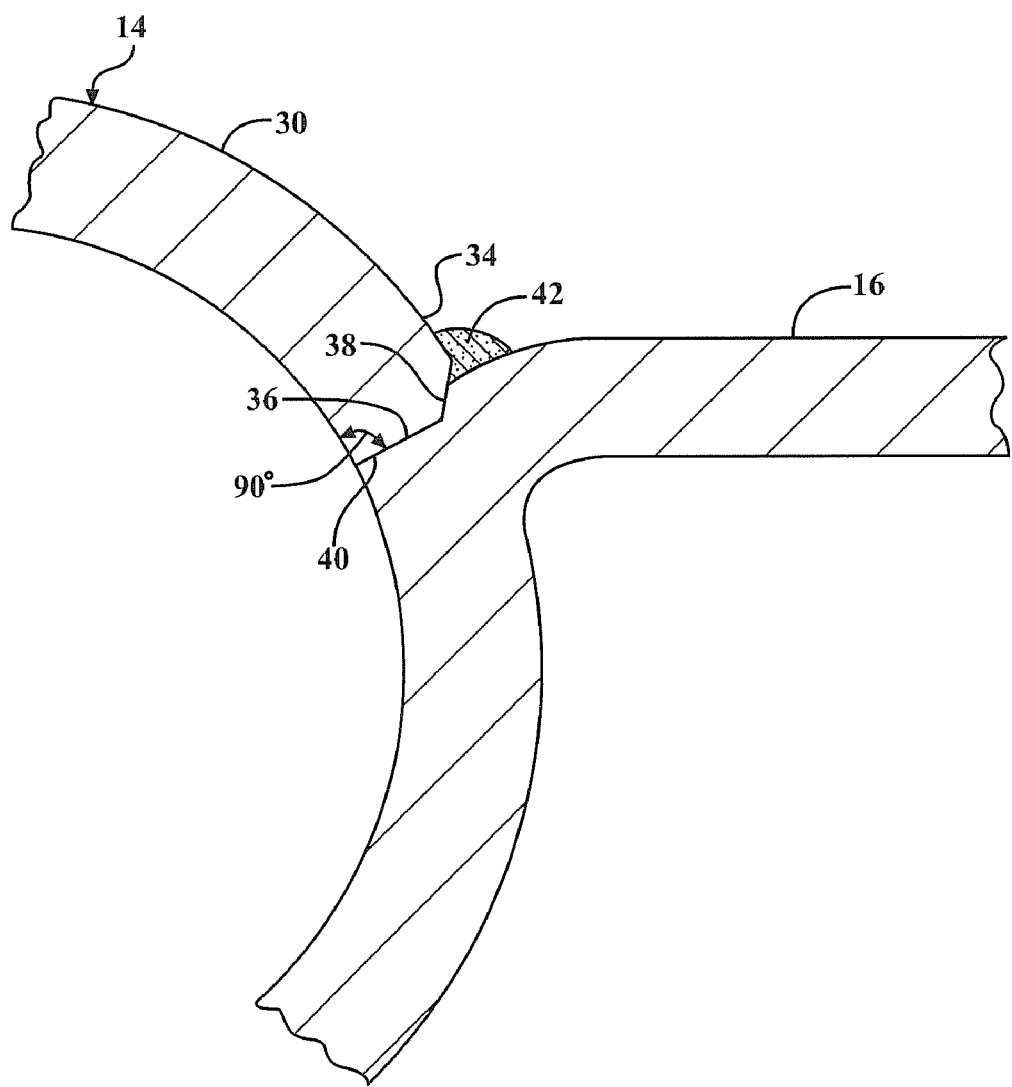
FIG. 4 shows an expanded view of section 4-4 as shown in FIG. 3.

The second mount 14 is formed from a loop 30 as best seen in FIGS. 2 and 3. The second mount 14 defines a second axis 32. The second axis 32 is oriented in a substantially perpendicular relationship to the first axis 24, the purpose of which will become more evident further below. Referring now to FIG. 4, the loop 30 includes a distal end 34 that defines a mating face 36. The mating face 36 includes a chamfered edge 38 providing manufacturing benefits when forming the second mount 14 from the loop 30 facilitating the annular formation of the loop. It has been determined by the inventors the chamfered edge 38 allows the loop 30 to be formed. If the chamfered edge 38 is absent, forming the loop 30 is greatly inhibited. In on embodiment, the chamfered edge 38 is formed by coining operation prior to forming the loop 30. Other methods of forming the chamfered edge 38 are also contemplated by the inventor. The body portion 16 defines a receptor having a substantially mirrored configuration to the mating surface 36 of the distal end 34 of the loop 30. As represented in FIG. 4, a weld material 42 or equivalent is applied to the interface between the mating surface 36 and the receptor 40 to secure and enclose the loop 30 to the body portion 16. Further dimensional stability is provided to the body portion 16 by a rib or contour 44 having a lengthwise orientation to the body portion 16 in one embodiment for stiffening purposes. Other embodiments include a rib 44 having an orientation normal, or generally normal to the lengthwise orientation of the body portion 16. A still further embodiment includes a rib or contour disposed anywhere between the first mount 12 a distal end of the second mount 14 including the body portion 16 and the loop 30. As best represented in FIG. 2, opposing flanges 26 transition toward the second mount 14 via opposing corners 46 after which, the flanges terminate into the loop 30 of the second mount 14. The radial dimension of the corners 46 can vary as necessary for manufacturing process control.

Figure 5:
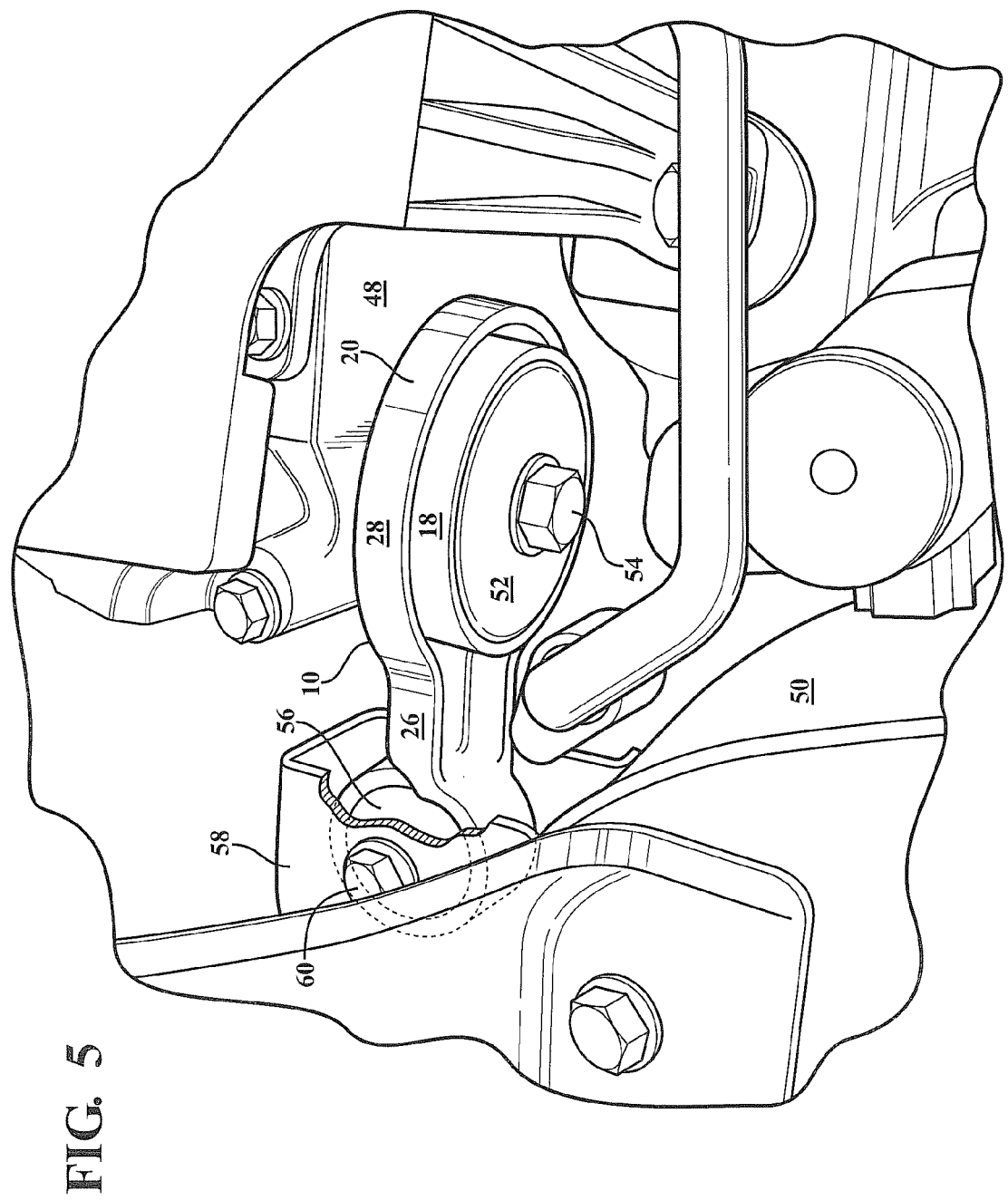
FIG. 5 shows an environmental view of the arm of the present invention located in an engine compartment of a motor vehicle.

Referring now to FIG. 5, where the inventive link 10 is shown installed in a vehicle engine compartment mating an engine 48 to a frame 50 of a motor vehicle (not shown). In this embodiment, the frame 50 is represented as a shock tower. However, it should be understood that the link 10 of the present invention can mount the engine 48 to other frame components of the motor vehicle. A first grommet 52 is received by the first mount 12 and includes a substantially similar thickness to the axial length of the inner annular wall 18 of the first mount 12. A first fastening system 54 is received by the grommet 52 and secures the grommet 52, and therefore the link 10, to the engine 48 of the motor vehicle. In this embodiment, the first fastening system 54 is represented as a bolt or screw. However, it should be understood by those of ordinary skill in the art that alternative fastening systems may be used to secure the link 10 to the engine 48.

A second grommet 56 is received by the second mount 14 and includes a perpendicular orientation to the first grommet 52 in a similar manner as the axial orientation between the first and second mounts 12, 14. A frame bracket 58 receives a second fastening system 60 to secure the link 10 via the second grommet 56 to the frame bracket 58. In this embodiment, the second fastening system 60 is represented as a bolt or screw. However, it should be understood to those of ordinary skill in the art that alternative fastening systems may be used to secure the link 10 to the frame 50.

The first and second grommets 52, 56 are formed from an elastomeric material having a necessary durometer to both secure the link between the engine 48 and the frame 50 and provide necessary damping characteristics to reduce the amount of vibration transferred from the engine 48 to the frame 50 of the motor vehicle. Alternative methods of securing the grommets 52, 56 to the link 10 are contemplated by the inventor, including injection molding the elastomeric material into the link, or premolding the grommets 52, 56 for subsequent installation into the first and second mounts 12, 14.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A link securing the position of a motor relative to a motor vehicle frame, said link comprising:
    a body portion;
    a first mount integrally formed with a first end of said body portion and a second mount integrally formed with a second end of said body portion opposite said first end, said body portion including opposing flanges integrally formed with and extending generally perpendicularly from opposing sides of said body portion and extending longitudinally between said first mount and said second mount;
    said first mount comprising a continuous ring, said continuous ring including an inner annular wall and an outer annular wall, said outer annular wall being spaced concentrically outwardly from said inner annular wall and connected to said inner annular wall by a connecting wall, said inner annular wall defining a first central opening wherein a first axis passes through said first central opening, and said outer annular wall forming a continuous surface with said opposing flanges;
    said second mount comprising a proximal end and an opposing distal end, wherein said proximal end is integral with said second end of said body portion and with said opposing flanges, and said distal end is bent toward said proximal end such that said second mount forms a loop, said loop enclosing a second central opening around a second axis, said second axis being substantially perpendicular to said first axis, and said distal end defining a chamfered edge with said chamfered edge anchored to a receptor disposed on said second end of said body portion; and
    said link being of monolithic construction and defining a substantially constant thickness throughout.

2. The link set forth in claim 1, wherein said body portion defines a stiffening rib located between said opposing flanges thereby increasing the stiffness of said link.

3. The link set forth in claim 1, including a stiffening rib defined in either said body portion or said loop thereby increasing the stiffness of said link.

4. An engine mounting assembly for securing a vehicle engine to a frame of a vehicle body, said assembly comprising:
    a link having: a body portion, a first mount integrally formed with a first end of said body portion, and a second mount integrally formed with a second end of said body portion opposite said first end, with said body portion including opposing flanges integrally formed with and extending generally perpendicularly from opposing sides of said body portion, and extending longitudinally between said first mount and said second mount, said link being of monolithic construction and having a substantially uniform thickness throughout, said first mount comprising a proximal end and an opposing distal end, wherein said proximal end is integral with said first end of said body portion and with said opposing flanges, and said distal end is bent toward said proximal end such that said first mount forms a loop, said distal end defining a chamfered edge with said chamfered edge anchored to a receptor disposed on said first end of said body portion, said first mount receiving a first resilient connector in said loop and said second mount receiving a second resilient connector in an annular opening therein;
    wherein said first mount defines a first axis passing through said loop, said second mount defines a second axis passing through said annular opening, and said first axis is generally perpendicular to said second axis, and
    wherein said second mount comprises an inner annular wall and an outer annular wall, said outer annular wall being spaced concentrically outwardly from said inner annular wall and connected to said inner annular wall by a connecting wall, said inner annular wall defining said annular opening, and said outer annular wall forming a continuous surface with said opposing flanges;
    a first fastening element connected to a frame of a vehicle body and being received by said first resilient connector of said first mount, and
    a second fastening element connected to a vehicle engine and being received by said second resilient connector of said second mount thereby securing the vehicle engine to the frame of the vehicle body.

5. The assembly set forth in claim 4, wherein said first fastening element and said second fastening element each include a fastener assembly for securing said assembly between the vehicle frame and the vehicle engine.

6. The assembly set forth in claim 4, wherein said inner annular wall includes an axial dimension greater than an axial dimension of said outer annular wall.

7. A link assembly for affixing a motor to a motor vehicle frame, said assembly comprising:
- a body portion;
- a first mount integrally formed with a first end of said body portion and defining a first annular opening with a first continuous wall, said first annular opening defining a first axis passing therethrough; and
- a second mount integrally formed with a second end of said body portion opposite said first end and defining a second annular opening with a second continuous wall, said second annular opening defining a second axis passing therethrough, said first axis being generally perpendicular to said second axis;
- said body portion including opposing flanges integrally formed with and extending generally perpendicularly from opposing sides of said body portion and extending longitudinally between said first mount and said second mount;
- said first mount comprising a proximal end and an opposing distal end, said proximal end being integral with said first end of said body portion and with said opposing flanges, wherein said distal end is bent toward said proximal end such that said first mount forms a loop, wherein said distal end is anchored to a receptor disposed on said first end of said body portion;
- said second mount comprising an inner annular wall and an outer annular wall, said outer annular wall being spaced concentrically outwardly from said inner annular wall and connected to said inner annular wall by a connecting wall, said inner annular wall defining said second annular opening, and said outer annular wall forming a continuous surface with said opposing flanges;
- said assembly being formed from a continuous sheet of material having a substantially constant thickness throughout.

8. The assembly set forth in claim 7, wherein said first annular opening receives a first elastomeric grommet and said second annular opening receives a second elastomeric grommet.

9. The assembly set forth in claim 7, wherein said inner annular wall includes an axial length greater than an axial length of said outer annular wall thereby defining a J-shaped cross-section.

10. The assembly set forth in claim 7, wherein said body portion includes a stiffening rib disposed between said first mount and said second mount.

11. The assembly set forth in claim 7, wherein said first mount or said second mount includes a stiffening rib.

12. The assembly set forth in claim 7, including a weld joint mating one of said first mount or said second mount to said body portion.

* * * * *